(12) United States Patent
Thornbrough

(10) Patent No.: US 9,414,578 B2
(45) Date of Patent: Aug. 16, 2016

(54) SPEARFISHING APPARATUS

(71) Applicant: Bradley G. Thornbrough, Fort Lauderdale, FL (US)

(72) Inventor: Bradley G. Thornbrough, Fort Lauderdale, FL (US)

(73) Assignee: Thornzander Enterprises, Inc., Fort Lauderdale, FL (US)

( * ) Notice: Subject to any disclaimer, the term of this patent is extended or adjusted under 35 U.S.C. 154(b) by 67 days.

(21) Appl. No.: 14/084,147

(22) Filed: Nov. 19, 2013

(65) Prior Publication Data

US 2015/0136103 A1    May 21, 2015

(51) Int. Cl.
*F41B 7/04* (2006.01)
*A01K 81/06* (2006.01)
*A01K 81/00* (2006.01)

(52) U.S. Cl.
CPC ............. *A01K 81/06* (2013.01); *A01K 81/00* (2013.01); *F41B 7/04* (2013.01)

(58) Field of Classification Search
CPC ............. F41B 7/04; F41B 3/02; A01K 91/02; A01K 81/00; A01K 81/06
USPC ............. 124/17, 20.1, 20.3, 22, 41.1; 43/19, 6
See application file for complete search history.

(56) References Cited

U.S. PATENT DOCUMENTS

| 181,891 | A | * | 9/1876 | Algeo | F41B 7/04 124/22 |
|---|---|---|---|---|---|
| 306,422 | A | * | 10/1884 | Peters | F41B 7/04 124/22 |
| 368,588 | A | * | 8/1887 | Horton | F41B 7/04 124/22 |
| 599,747 | A | * | 3/1898 | Stoddard | F41B 7/04 124/22 |
| 1,375,776 | A | * | 4/1921 | Buys | F41B 3/02 124/20.3 |
| 1,379,944 | A | * | 5/1921 | Story | F41B 3/02 124/22 |
| 1,839,640 | A | * | 1/1932 | Bowles | A63F 1/14 124/17 |
| 2,522,060 | A | * | 9/1950 | Ridland | F41B 7/04 124/22 |
| 2,645,217 | A | * | 7/1953 | Fisher | F41B 3/02 124/16 |
| 2,760,480 | A | * | 8/1956 | Carroll | F41B 7/04 124/22 |
| 2,762,358 | A | * | 9/1956 | Kinnaman | F41B 7/04 124/22 |

(Continued)

*Primary Examiner* — Alexander Niconovich
(74) *Attorney, Agent, or Firm* — Christopher & Weisberg, P.A.

(57) ABSTRACT

A device for spearfishing, which device may include a barrel including a first end and a second end, the barrel defining a spear conduit and two band conduits, the spear conduit and the two band conduits extending with the barrel from the first end to the second end. The spear conduit may be coaxial with the longitudinal axis of the barrel. The spear conduit may be located between the two band conduits, and each of the band conduits may be parallel to the spear conduit. The barrel may define a recessed groove, which may extend from the first end of the barrel to the second end of the barrel. The device may further include a handle or other accessories that are releasably engaged with the recessed groove. The device may further include band attachment means, such as a cone-shaped plug, for releasably coupling a band to the barrel.

18 Claims, 15 Drawing Sheets

(56) References Cited

U.S. PATENT DOCUMENTS

| | | | | |
|---|---|---|---|---|
| 2,853,992 A * | 9/1958 | Wheeler | F41B 3/02 | 124/20.3 |
| 3,006,330 A * | 10/1961 | De Bach | F41B 7/04 | 124/22 |
| 3,016,891 A * | 1/1962 | Ebeling | F41B 7/04 | 124/22 |
| 3,101,704 A * | 8/1963 | McCormick | F41B 3/02 | 124/17 |
| 3,108,583 A * | 10/1963 | Andis | F41B 5/12 | 124/20.1 |
| 3,119,385 A * | 1/1964 | Ashley | F41B 7/025 | 124/19 |
| 3,194,226 A * | 7/1965 | Hoff | F41B 3/02 | 124/22 |
| 3,262,441 A * | 7/1966 | Senne | F41B 7/04 | 124/22 |
| 3,265,054 A * | 8/1966 | Gruenenfelder | F41B 7/04 | 124/22 |
| 3,340,642 A * | 9/1967 | Vasiljevic | F41B 7/04 | 102/504 |
| 3,455,288 A * | 7/1969 | Knerr | F41B 3/02 | 124/22 |
| 3,585,979 A * | 6/1971 | Hendricks | F41B 7/04 | 124/22 |
| 3,683,882 A * | 8/1972 | Braxton | F41B 7/04 | 124/20.1 |
| 3,741,190 A * | 6/1973 | Lopez | F41B 7/04 | 124/22 |
| 3,749,075 A * | 7/1973 | Saunders | F41B 3/02 | 124/20.1 |
| 3,773,026 A * | 11/1973 | Romero | F41B 7/04 | 124/22 |
| 4,014,125 A * | 3/1977 | Baldi | A01K 81/00 | 124/22 |
| 4,027,418 A * | 6/1977 | Baldi | A01K 81/00 | 43/6 |
| 4,193,386 A * | 3/1980 | Rossi | F41B 7/04 | 124/22 |
| 4,297,985 A * | 11/1981 | Rodriguez | F42B 6/04 | 124/22 |
| 4,373,503 A * | 2/1983 | Saunders | F41B 3/02 | 124/20.1 |
| 4,573,445 A * | 3/1986 | Webb | F41B 3/02 | 124/22 |
| 4,587,943 A * | 5/1986 | Ross | F41B 3/02 | 124/20.1 |
| 4,703,744 A * | 11/1987 | Taylor | F41B 3/02 | 124/20.1 |
| 4,722,316 A * | 2/1988 | Stinnett | F41B 3/02 | 124/16 |
| 4,759,336 A * | 7/1988 | Frain | F41A 17/22 | 124/22 |
| 4,895,128 A * | 1/1990 | Okada | F41B 7/04 | 124/22 |
| 5,125,388 A * | 6/1992 | Nicely | F41B 3/02 | 124/20.1 |
| 5,145,740 A * | 9/1992 | Boykin | F41B 7/043 | 124/20.3 |
| 5,243,955 A * | 9/1993 | Farless | F41B 3/005 | 124/20.1 |
| 5,372,118 A * | 12/1994 | Schmidt, III | F41B 7/04 | 124/20.3 |
| 5,524,603 A * | 6/1996 | Menzer | F41B 7/04 | 124/20.3 |
| 5,762,056 A * | 6/1998 | Kysilka | F41B 3/02 | 124/20.1 |
| 5,904,132 A * | 5/1999 | Biller | F41B 7/04 | 12/34 |
| 5,931,145 A * | 8/1999 | Oviedo-Reyes | F41B 5/12 | 124/20.3 |
| 6,708,683 B1 * | 3/2004 | Harris | F41B 7/04 | 124/20.3 |
| 6,823,855 B2 * | 11/2004 | Omi | F41B 3/02 | 124/20.1 |
| 6,895,950 B2 * | 5/2005 | Gillet | F41B 7/04 | 124/20.3 |
| 6,953,034 B2 * | 10/2005 | May | A01K 81/00 | 124/17 |
| 7,448,371 B2 * | 11/2008 | Sapir | F41B 3/005 | 124/16 |
| 7,926,474 B2 * | 4/2011 | Berry | A01K 81/06 | 124/20.3 |
| 8,387,602 B1 * | 3/2013 | Bruington | F41B 7/04 | 124/20.3 |
| 8,662,060 B2 * | 3/2014 | Walterscheid | F41B 5/12 | 124/20.3 |
| 8,689,773 B2 * | 4/2014 | Walterscheid | F41B 5/0094 | 124/23.1 |
| 2007/0163558 A1 * | 7/2007 | Riffe | F41B 3/005 | 124/22 |
| 2009/0038600 A1 * | 2/2009 | Robinik | F41B 7/04 | 124/22 |
| 2012/0085330 A1 * | 4/2012 | Hickerson | A01K 81/04 | 124/22 |
| 2013/0333680 A1 * | 12/2013 | Canterbury | F41B 3/02 | 124/20.3 |
| 2014/0165981 A1 * | 6/2014 | Lien | F41B 5/1403 | 124/20.3 |

* cited by examiner

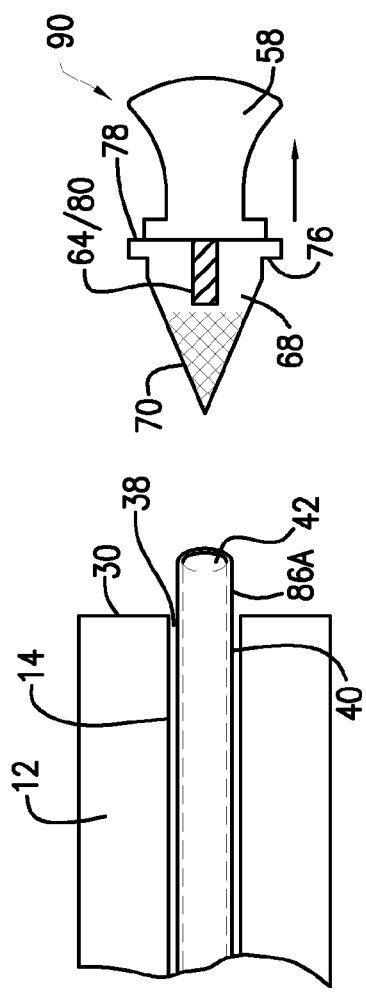
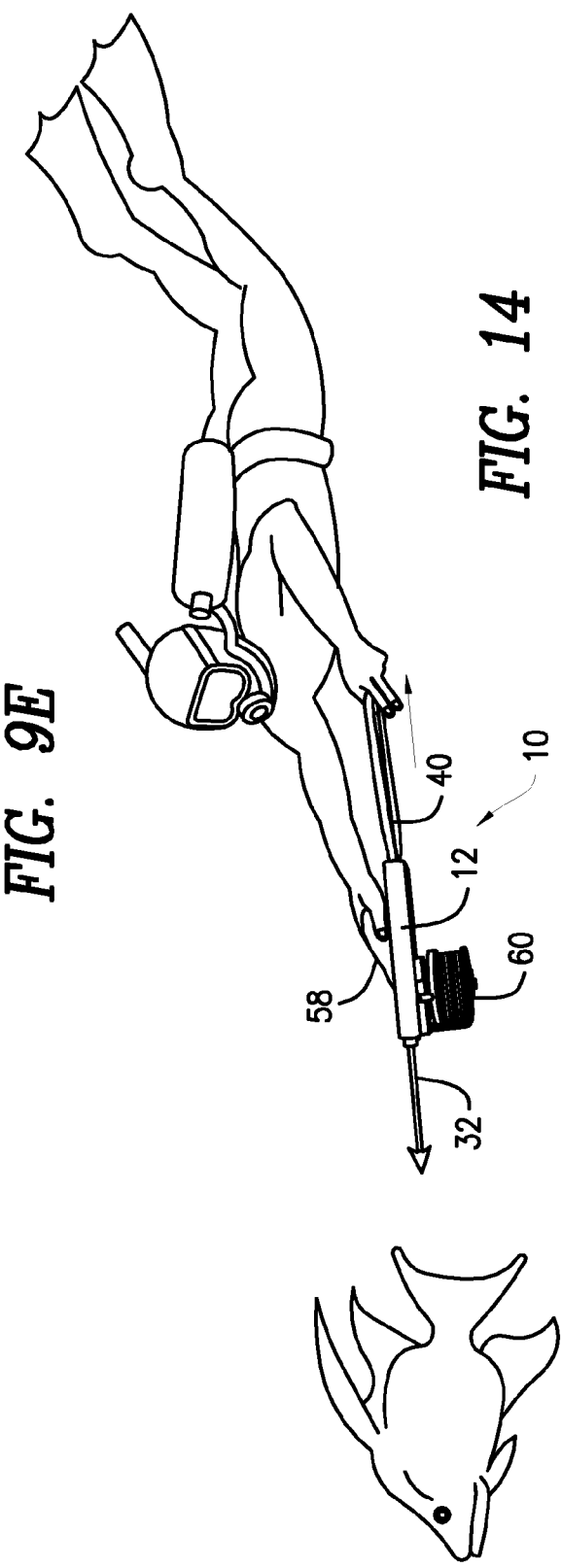
FIG. 9E
FIG. 14

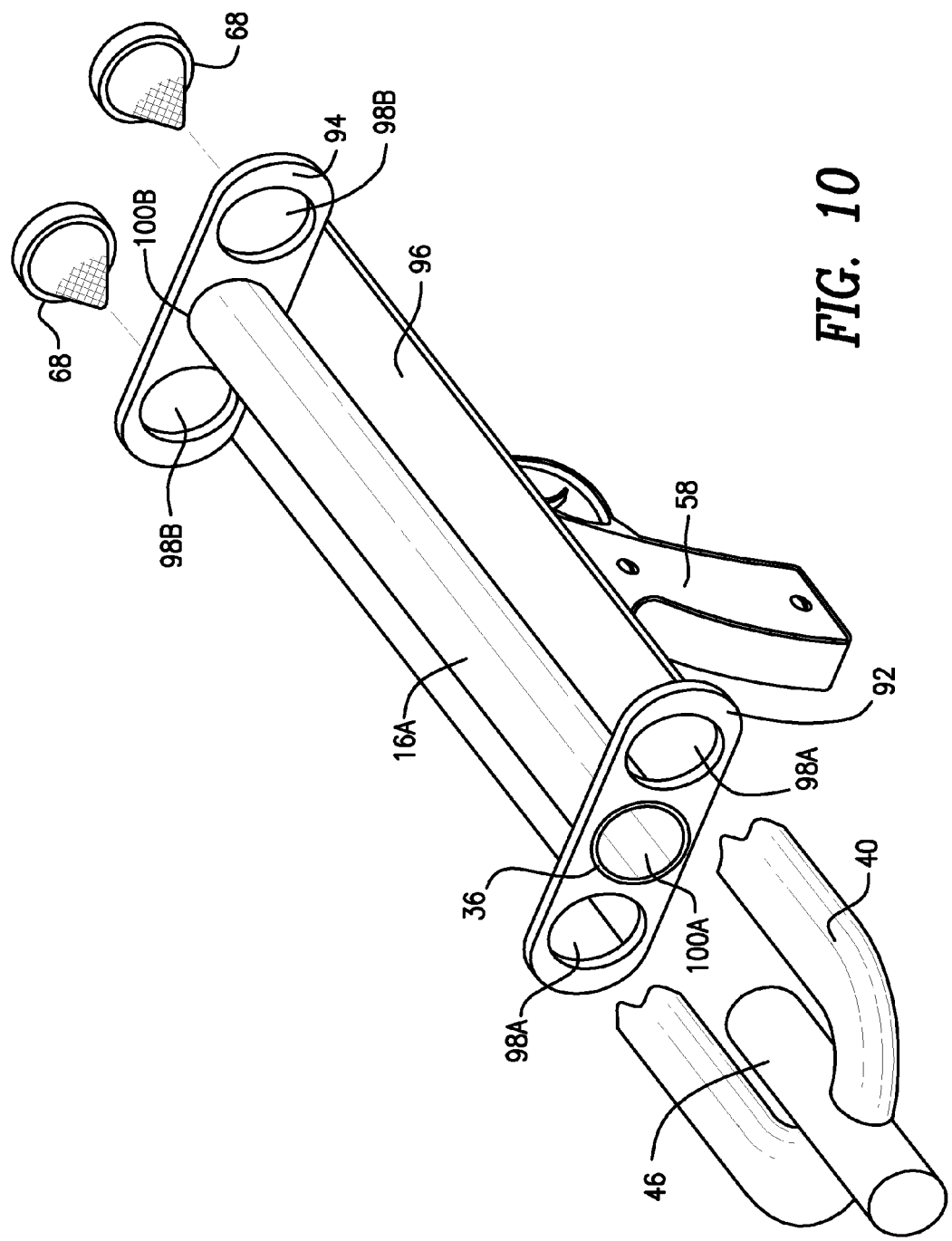

SPEARFISHING APPARATUS

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates to a device and system for spearfishing. In particular, the present invention relates to a device and system for hand-powered speargun.

BACKGROUND OF THE INVENTION

Catching fish with a spear or pointed stick is a technique that has been around for thousands of years, but use of the modern-style spearguns began in the mid-twentieth century. A speargun allows the user to fire a shaft or spear at a fish from either under or above the water. Commonly used types of spearguns include hand-powered spearguns and air-powered or pneumatic spearguns, either of which being used with or without a trigger. Triggerless hand-powered spearguns include the popular "Hawaiian sling," which operates similar to a bow and arrow.

Hand-powered spearguns, such as the Hawaiian sling, generally include a stock or barrel (depending on whether the speargun is made of wood or metal, although the terms are sometimes interchanged), a spear, and a piece of rubber tubing or rubber band connected to the barrel and engageable with the spear. When the rubber tubing is stretched away from the barrel and released, the resulting force propels the shaft through the barrel and toward a target. Hand-powered spearguns may include a trigger release or the band may be released by hand, similar to an archery bow. Air-powered or pneumatic spearguns, on the other hand, generally include thicker spears than hand-powered spearguns, and the spear is disposed within a sealed internal barrel enclosed in an outer casing that contains air. The air may be pressurized from ambient pressure by hand to adapt to various targets and situations. A trigger is used to discharge the spear, much like an air gun.

Some pneumatic spearguns may be somewhat more powerful than hand-powered spearguns; however, they are also more difficult to operate, especially underwater. The simple design of most hand-powered spearguns makes them attractive to purists and those who are new to the sport. However, some known designs of hand-powered spearguns include a rubber tubing or band that is attached on either side of the proximal end of the barrel, nearest to the user. Further, the band is typically about 24 inches, with about 12 inches on either side of the bend. Although it may be possible for an adult to pull the band to a stretched length of about four feet, this proximal point of band attachment limits the amount of power available for expelling the spear from the barrel.

Other known designs of hand-powered spearguns include a rubber tubing or band that is attached on either side of a distal end of the barrel, farther from the user. In contrast to the proximally attached configuration, the distally attached configuration may allow the user to exert a greater pull force on the band and therefore create more power for expelling the spear. However, even this configuration has its drawbacks. Positioning the point of band attachment at the distal end of the barrel may cause bend in the barrel and/or may cause undesired movement in the stock or barrel as the tensioned band is released, which, in turn, may cause "shaft whip" or an uneven spear trajectory. Still further, the band may be disposed along the outside of the barrel, exposing it to snagging on other gear or equipment. Additionally, the external band may eliminate the user's ability to grasp the barrel while retracting the spear.

Additionally, known designs of hand-powered spearguns involve inefficient or permanent means for attaching the band to the barrel, which frustrate or prevent replacement of the band. For example, many hand-powered spearguns include a band that is attached to the barrel by tightly wrapping string, cord, or line around the band ends and the barrel. Not only is such an attachment means not very secure, but the speargun is usually discarded when the band breaks or begins to disintegrate. Further, other configurations include passing the ends of a tubing-style band through a hole on either side of the barrel. A plastic or metal plug is inserted into the lumen of the rubber tubing that has a larger diameter than the inner diameter of the tubing lumen, which prevents the band from being pulled through the holes when the user exerts a pull force on the band. However, this attachment means is permanent and the old band must be destroyed to install a new one.

Finally, although some known spearguns are configured to accept removably attachable accessories such as a cord reel, no known spearguns are configured to universally accept any of a variety of accessories and to allow for user customization of the placement of those accessories based on the user's preferred grip, hand size, and other personal factors.

It is therefore desired to provide a hand-powered speargun that allows for a greater pull force and, therefore, power in expelling the spear without causing barrel deformation and/or shaft whip. It is further desired to provide a hand-powered speargun that may be easily manufactured and that has a means for quickly and easily removing and replacing the band and for customizing the speargun with accessories, handle placement, reel placement, and other options.

SUMMARY OF THE INVENTION

The present invention advantageously provides a spearfishing device that allows a greater pull force to be exerted on a band while maintaining spear shot accuracy. Further, the present invention advantageously provides a spearfishing device that may be customized according to the user's preferences, including the addition of any of a variety of accessories. In one embodiment, the device may generally include a barrel including a first end and a second end, the barrel defining a spear conduit and two band conduits, the spear conduit and the two band conduits extending with the barrel from the first end to the second end. The barrel may further include a longitudinal axis, the spear conduit being coaxial with the longitudinal axis. The spear conduit may be located between the two band conduits, and each of the band conduits may be parallel to the spear conduit. The barrel may further include a first longitudinal surface, a longitudinal second surface, a third longitudinal surface, and a fourth longitudinal surface, and the first and second longitudinal surfaces may be flattened. The third and fourth longitudinal surfaces may be rounded. Further, at least one of the first and second longitudinal surfaces may define a recessed groove, and the recessed groove may extend from the first end of the barrel to the second end of the barrel. The recessed groove may have a T-shaped cross section. The device may further include a handle that is releasably engaged with the recessed groove.

In another embodiment, the device may generally include a barrel including a plurality of surfaces, a longitudinal axis, a first end, and a second end, a spear conduit defined within the barrel and extending from the first end to the second end, the spear conduit being coaxial with the longitudinal axis, two band conduits defined within the barrel and extending from the first end to the second end, the spear conduit being located between and parallel to the two band conduits, and at least one recessed groove defined in at least one of the plurality of surfaces of the barrel. The plurality of surfaces may include a first flattened surface, a second flattened surface, a first rounded surface, and a fourth rounded surface. The at least one recessed groove may include a first longitudinal recessed groove defined by the barrel on the first flattened surface and a second longitudinal recessed groove defined by the barrel on the second flattened surface. The device may further include a handle that is releasably engageable with the at least one recessed groove.

In still another embodiment, the device may generally include a barrel including a first flattened surface, a second flattened surface, a first rounded surface, a second rounded surface, a longitudinal axis, a first end, and a second end, a spear conduit defined within the barrel and extending from the first end to the second end, the spear conduit being coaxial with the longitudinal axis, a first band conduit and a second band conduit, each band conduit being defined within the barrel and extending from the first end to the second end, the spear conduit being located between and parallel to the first and second band conduits, a band having a first end and a second end, a first portion of the band being disposed within the first band conduit and a second portion of the band being disposed within the second band conduit, a first band attachment means coupling the first end of the band to the barrel at the second end of the barrel and a second band attachment means coupling the second end of the band to the barrel at the second end of the barrel, and at least one recessed groove defined in at least one of the first flattened surface and the second flattened surface of the barrel. The first and second band attachment means may attach the band to the barrel such that the band passes within the first band conduit from the first band attachment means to the first end of the barrel, out of the first band conduit at the first end of the barrel, into the second band conduit at the first end of the barrel, and within the second band conduit from the first end of the barrel to the second band attachment means. Each of the first and second band attachment means may be a plug including a longitudinal axis, a body portion, and a head portion. The plug body portion may be cone shaped, and the head portion may define a face that is substantially orthogonal to the longitudinal axis of the body portion. The plug may further include a threaded conduit that extends within the plug from the face to a location within the body portion.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIGS. 9A-9E show a method for coupling and removing a band from a hand-powered speargun;

FIG. 10 shows a perspective view of a second embodiment of a hand-powered speargun;

FIG. 14 shows a hand-powered speargun in use.

DETAILED DESCRIPTION OF THE INVENTION

Figure 1:
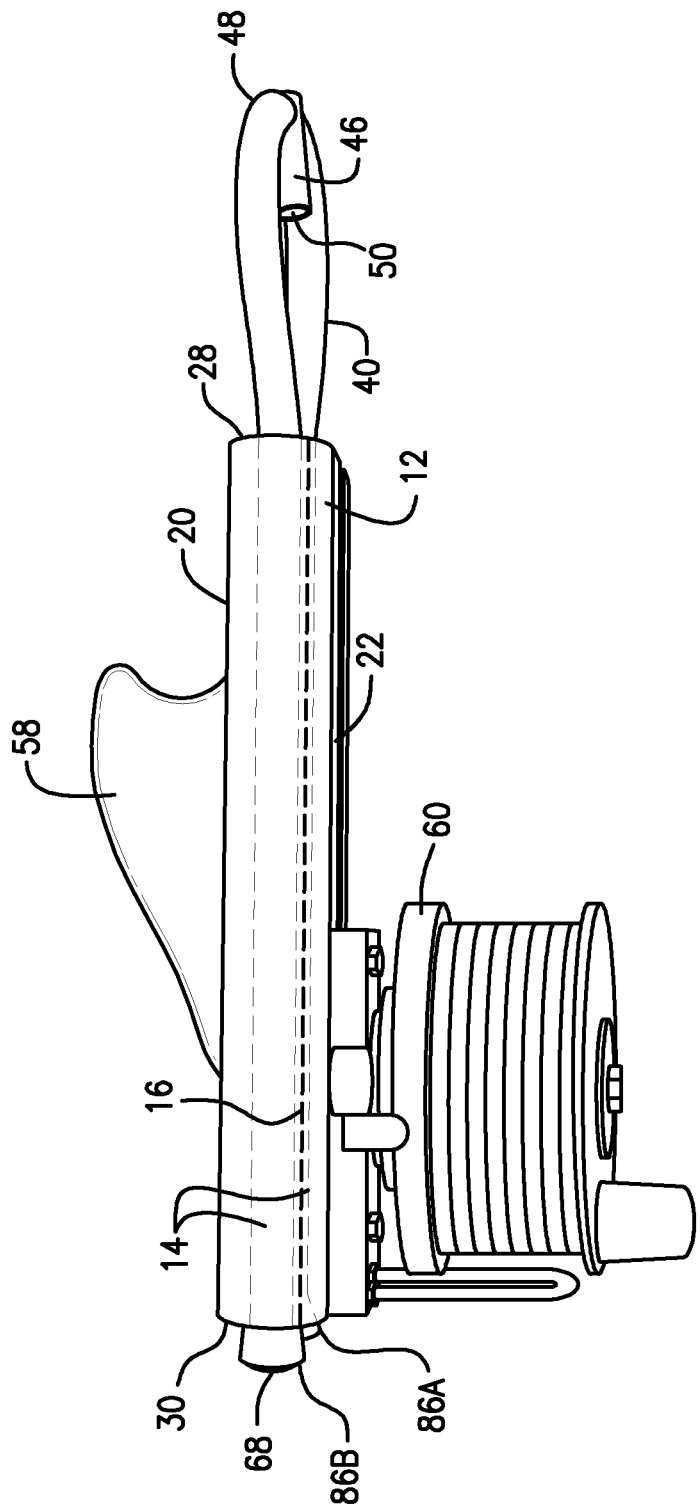
FIG. 1 shows a side view of a first embodiment of a hand-powered speargun.
Figure 2:
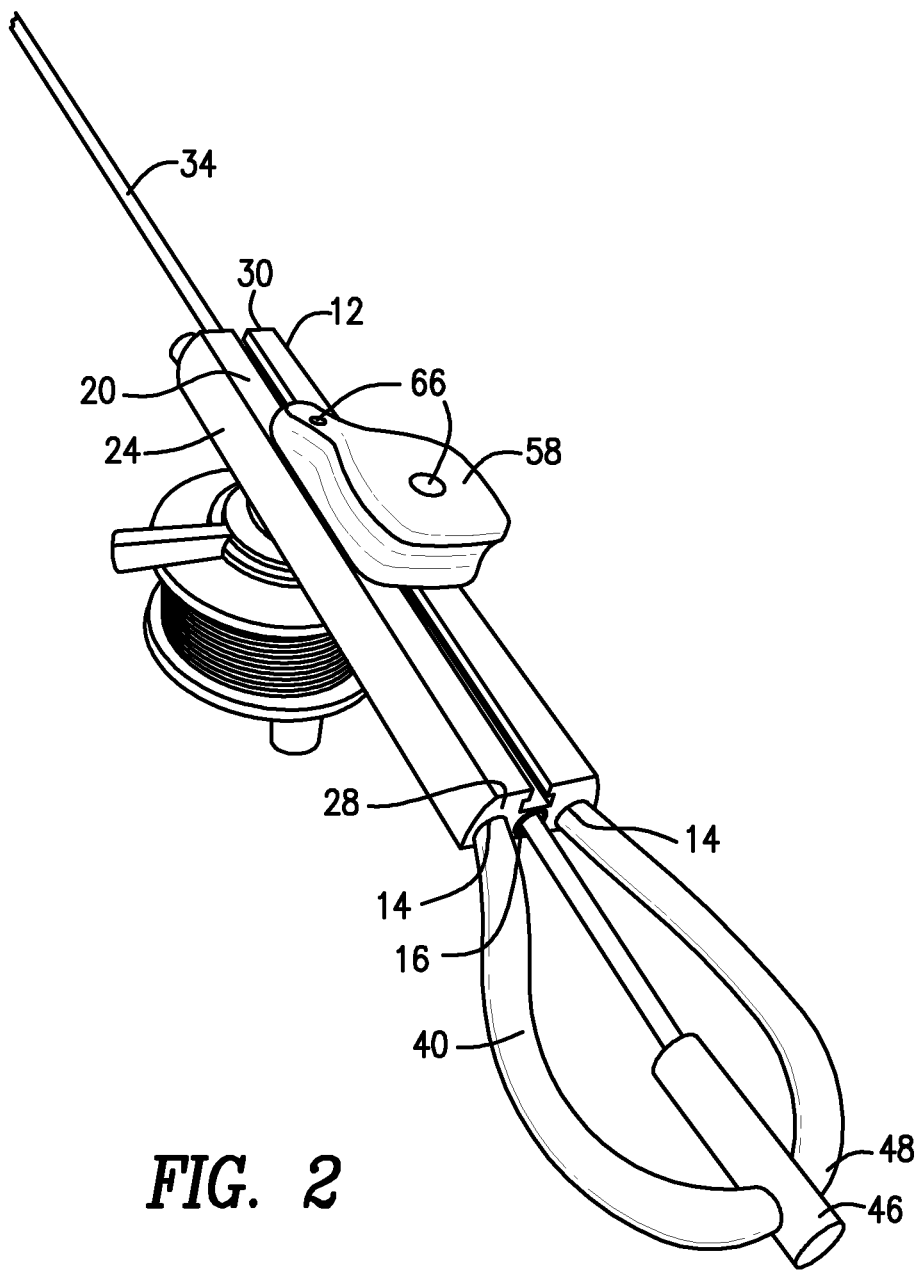
FIG. 2 shows a top perspective view of a first embodiment of a hand-powered speargun.
Figure 3:
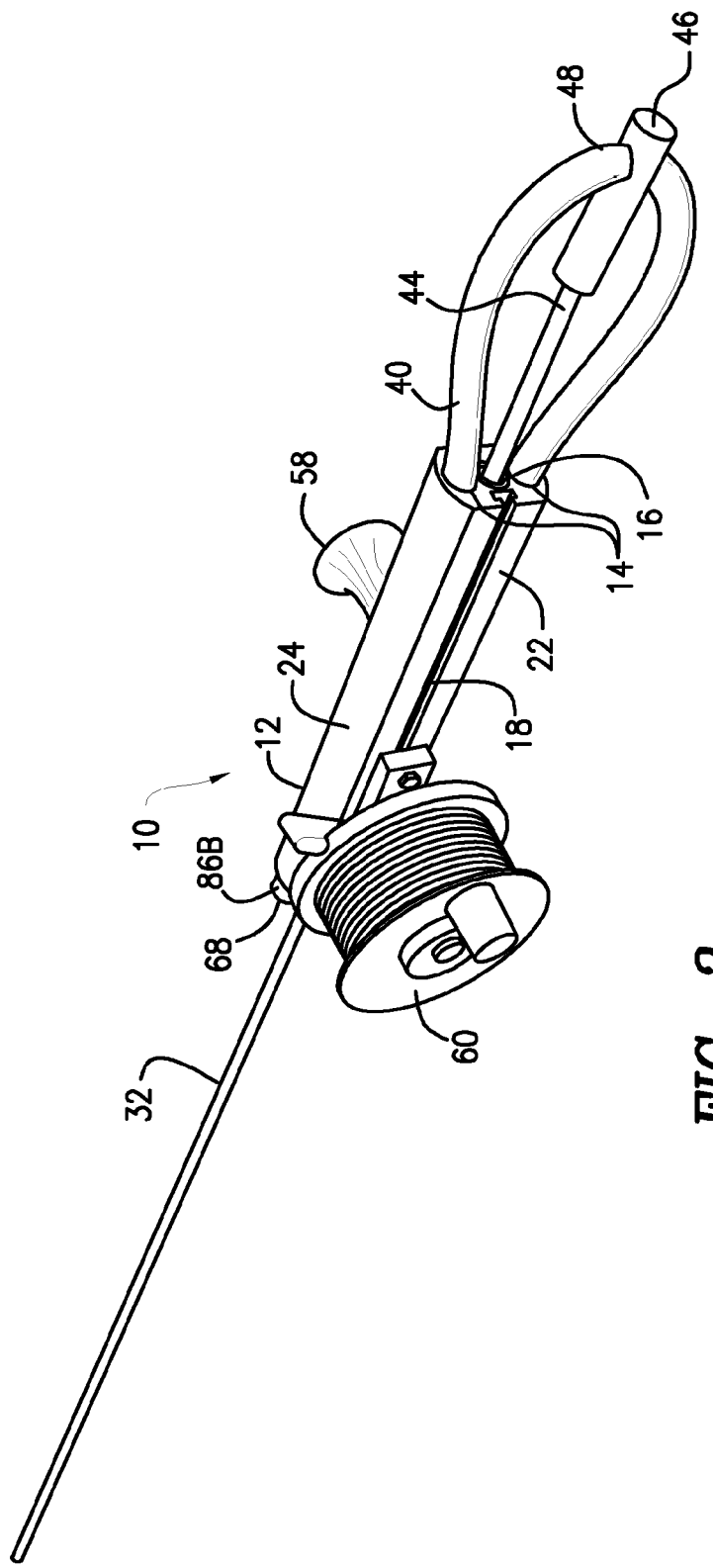
FIG. 3 shows a bottom perspective view of a first embodiment of a hand-powered speargun.

Now referring to the drawings in which like reference designators refer to like elements there is shown in FIGS. 1-6B an embodiment of a spearfishing device, namely, a hand-powered speargun, referred to generally as "10." The speargun 10 may generally include a barrel 12, two band conduits 14, and a spear conduit 16. The speargun 10 may also include a track 18 on one or more surfaces of the barrel 12 (as shown in FIGS. 2 and 3). In general, the speargun 10 provides distal points of attachment between the band and the barrel 12, but band conduits 14 also anchor the band to the barrel 12 until proximal points of attachment. The distal points of attachment may allow the user to exert a greater pull force on the band and therefore create more power for expelling the spear, and the proximal points of attachment may prevent undesired movement in the barrel 12 as the tensioned band is released.

The barrel 12 may serve as the body of the speargun 10, and may have any suitable cross-sectional shape, such as round, rectangular, oval, or combinations thereof. For example, the barrel 12 may include a first flattened surface 20, a second flattened surface 22, a first rounded surface 24, and a second rounded surface 26. The first 20 and second 22 flattened surfaces may facilitate placement of the track 18 and engagement between the barrel 12, the track 18, and a removably attached accessory. The shape of the first 24 and second 26 rounded surfaces may enhance the ergonomic qualities of the barrel 12. For example, the rounded surfaces 24, 26 may conform to the curvature of a user's hand, thereby enhancing the user's grip and control over the speargun 10. Additionally, the barrel 12 may have a length of between approximately six inches (about 152.4 mm) and approximately 14 inches (about 355.6 mm), and may have a hollow construction (for example, as shown in FIG. 6A) or solid construction (as shown in FIG. 6B).

Figure 4:
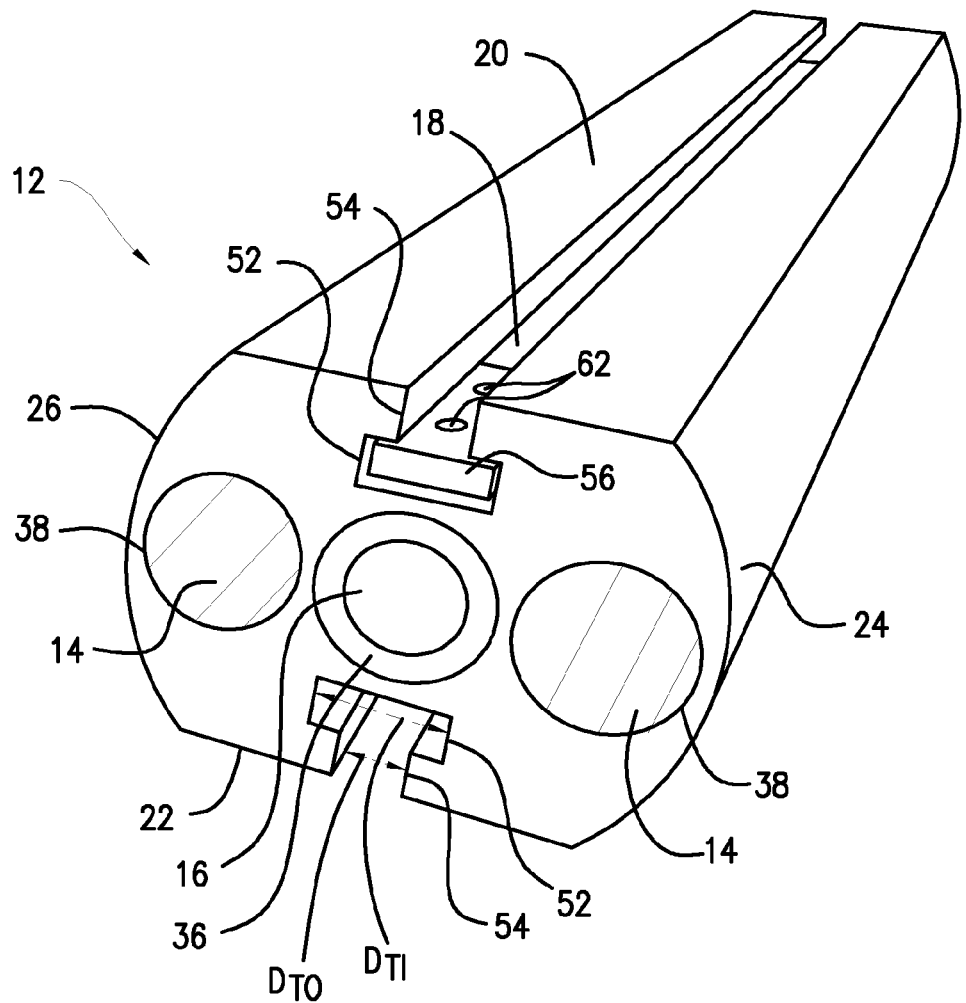
FIG. 4 shows a perspective view of a first embodiment of a hand-powered speargun barrel without a band or accessories.
Figure 5:
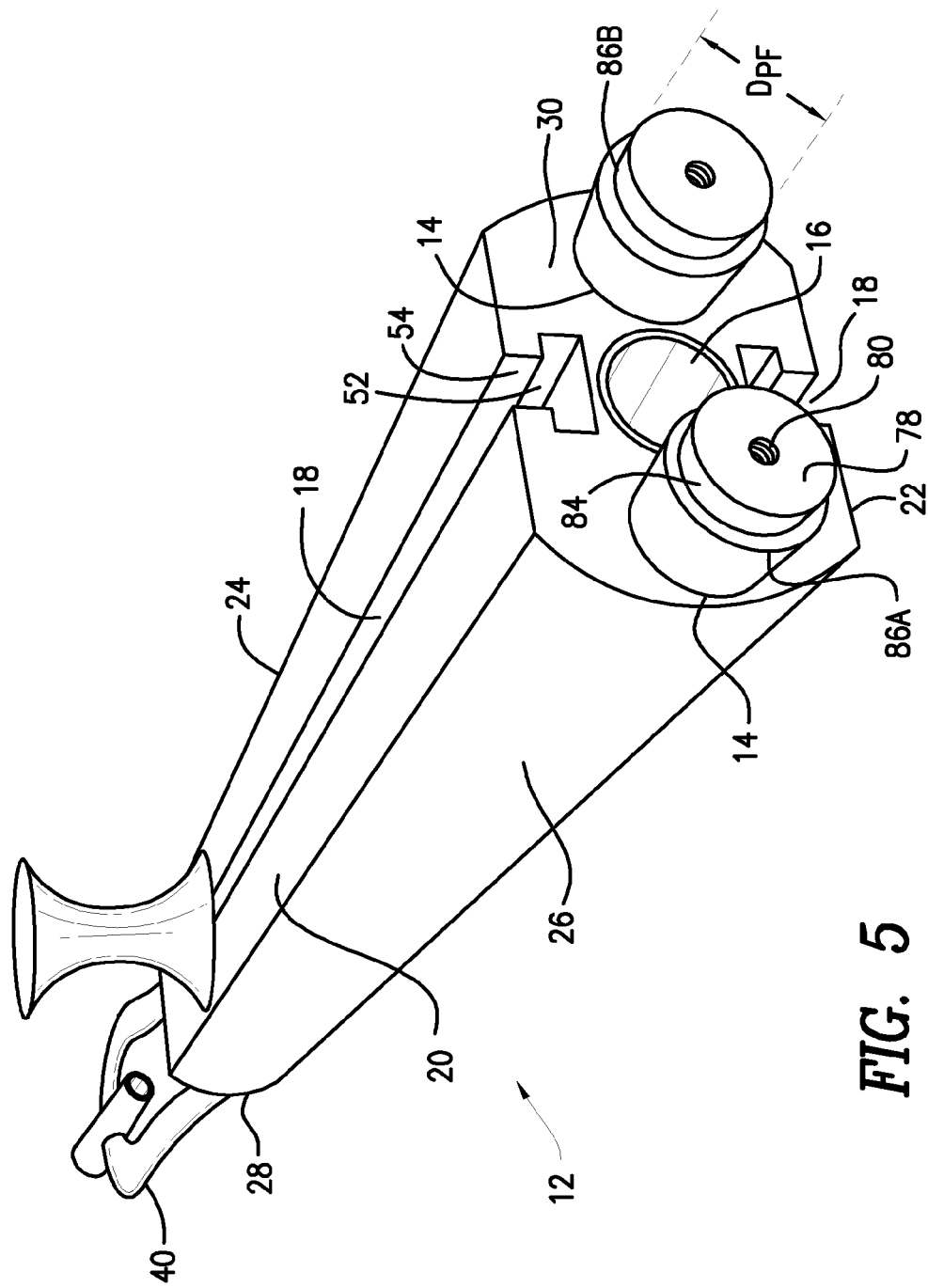
FIG. 5 shows a perspective view of a first embodiment of a hand-powered speargun barrel with a band.

The spear conduit 16 may extend entirely within the barrel 12 from a first end 28 of the barrel 12 to a second end 30 of the barrel 12. The first end 28 and second end 30 may be referred to as the proximal end of the barrel 12 and the distal end of the barrel 12, respectively, when viewed in relation to a user when the speargun 10 is in use. The spear conduit 16 may be located along a centerline 27 of the barrel 12 that is equidistant from each of the first 20 and second 22 flattened surfaces and equidistant from each of the first 24 and second 26 rounded surfaces (as shown in FIGS. 4 and 5). As shown in FIGS. 2-5, the spear conduit 16 may be sized and configured to accommodate a standard-sized spear 32 being slidably disposed within the barrel 12. The placement of the spear conduit 16 along the centerline 27 of the barrel 12 may allow the weight of the spear 32 to be evenly distributed within the barrel 12 and may enable the user to precisely aim the spear 32 at a target. The inner diameter $D_{ISC}$ of the spear conduit 16 may be larger than the outer diameter $D_{OS}$ of the spear shaft 34. However, the difference between the inner diameter $D_{ISC}$ of the spear conduit 16 and the outer diameter $D_{OS}$ of the spear shaft 34 should be great enough to allow the spear 32 to freely slide through the spear conduit 16, but small enough to prevent the spear 32 from "wobbling" within the spear conduit 16, such that the spear conduit 16 guides the spear 32 in a straight line as the spear 32 is expelled from the barrel 12.

Optionally, the inner diameter $D_{ISC}$ of the spear conduit 16 may be large enough to accommodate one or more bushings 36, each having a thickness $T_B$. A bushing 36 may be affixed to at least an inner surface of the spear conduit opening 38 at each end 28, 30 of the barrel 12, and optionally one or more bushings 36 may be affixed to an inner surface of the spear conduit 16 at regular or irregular intervals between the barrel ends 28, 30. Alternatively, a single bushing 36 may be affixed to an inner surface of the spear conduit 16, with the bushing 36 being coextensive with the spear conduit 16. The one or more bushings 36 may be composed of a material having a low coefficient of friction, such as self-lubricating silicone rubber or smooth plastic. Further, each bushing 36 may be coaxial with the spear conduit 16 in which it is located, and may be affixed to an inner surface of the spear conduit 16 using any suitable means, such as an adhesive, threading, or bonding agent. If the one or more bushings 36 are threaded to engage with a complementary threading on an inner surface of the spear conduit 16, the one or more bushings may be interchangeable to provide a variety of bushing thickness $T_B$ options. In this way, the spear conduit 16 may be customized to accommodate spears 32 having any of a variety of shaft 34 diameters. The one or more bushings 36 may dampen the sound of a spear shaft moving through the spear conduit 16.

Figure 6A:
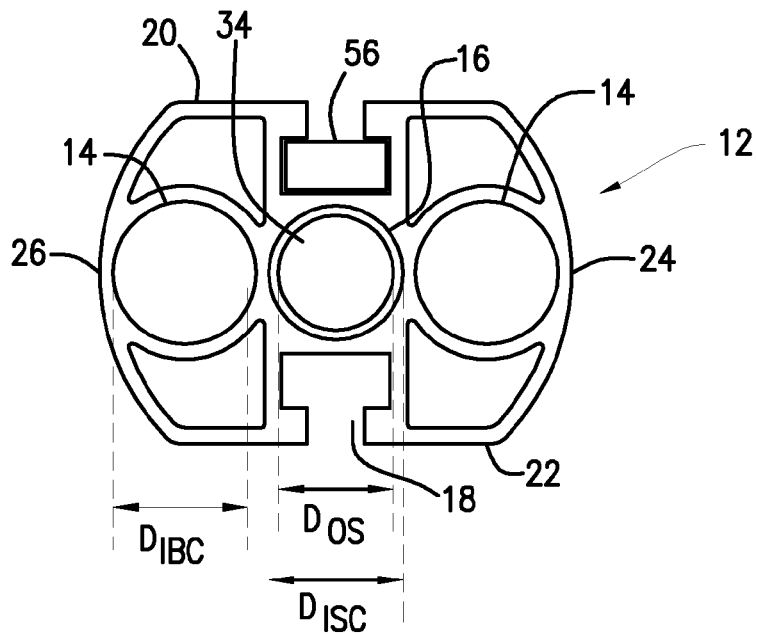
FIG. 6A shows a first cross-sectional view of a first embodiment of a hand-powered speargun barrel.
Figure 6B:
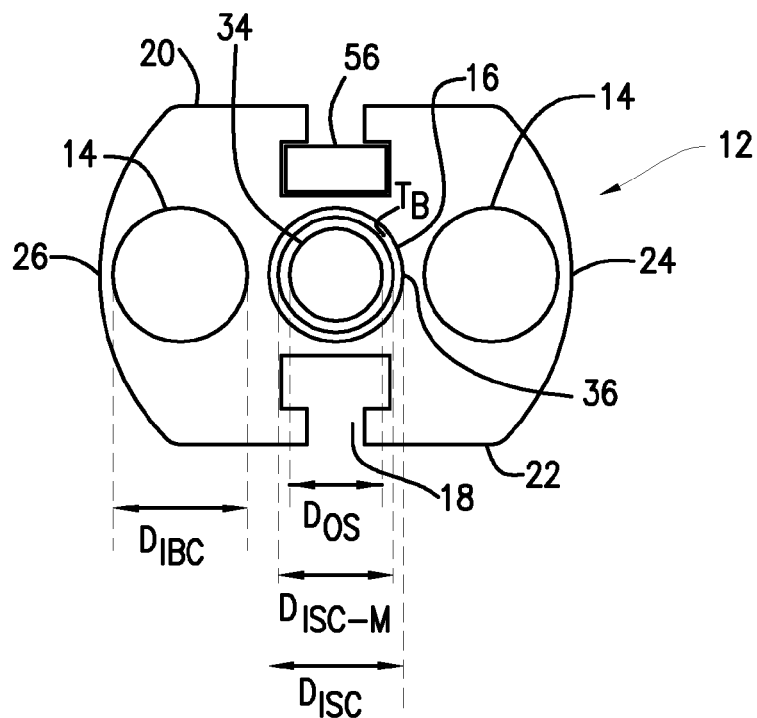
FIG. 6B shows a second cross-sectional view of a first embodiment of a hand-powered speargun barrel.

As a non-limiting example, the outer diameter $D_{OS}$ of the spear shaft 34 may be between approximately 6.35 mm (approximately ¼ inch) and approximately 7.94 mm (approximately 5/16 inch) and the inner diameter $D_{ISC}$ of the spear conduit 16 may be between approximately 9 mm and approximately 14 mm (as shown in FIG. 6A). As an alternative non-limiting example, if one or more bushings 36 are used, the inner diameter $D_{ISC}$ of the spear conduit 16 may be approximately 13 mm and the minimum inner diameter $D_{ISC-M}$ of the spear conduit 16 may be approximately 9 mm to accommodate a spear 32 having a shaft 34 that is approximately 6.5 mm (as shown in FIG. 6B). The minimum inner diameter $D_{ISC-M}$ of the spear conduit 16 may be the inner diameter $D_{ISC}$ of the spear conduit 16 minus the thickness $T_B$ of the one or more bushings 36.

Figure 11:
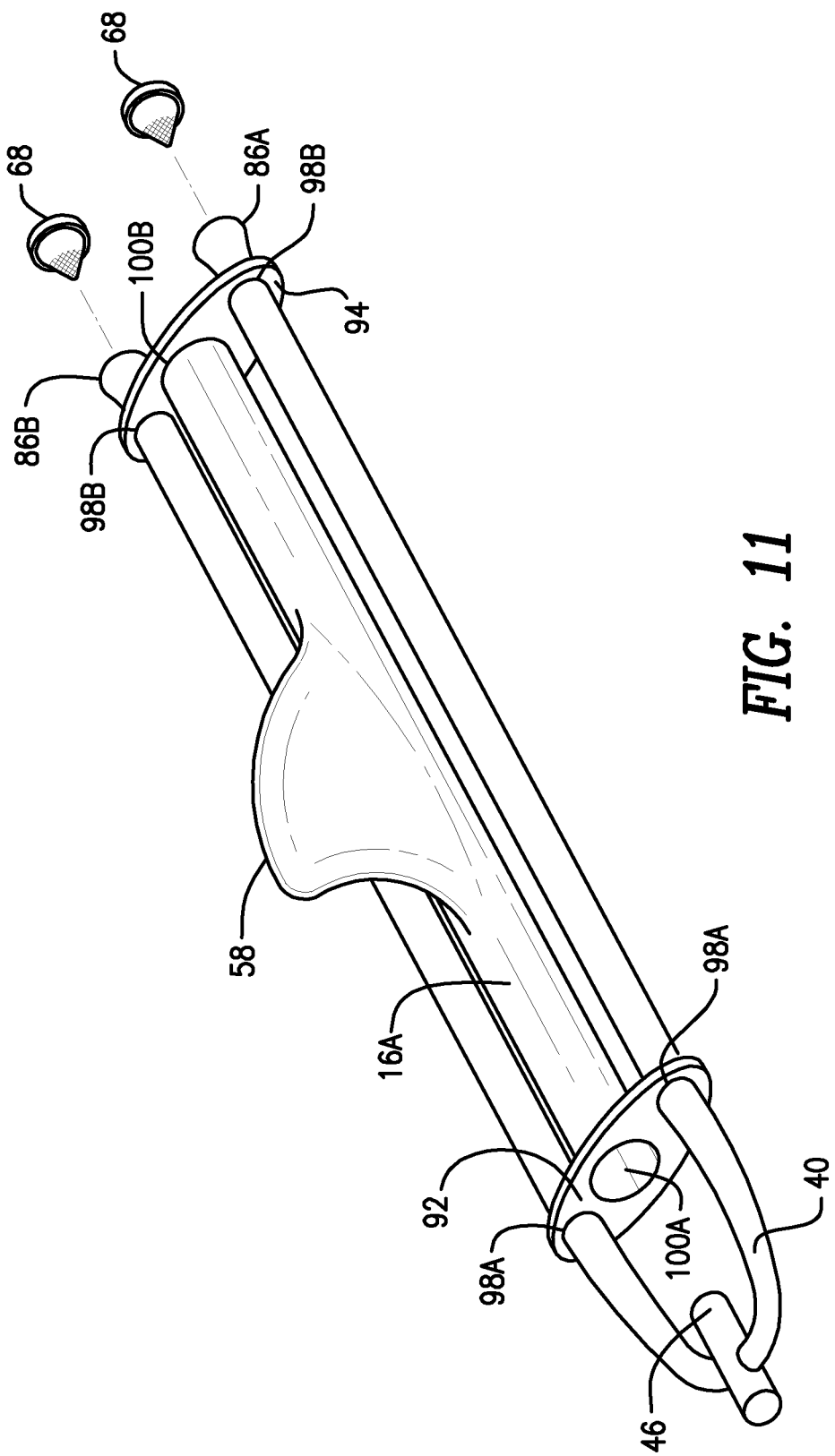
FIG. 11 shows a perspective view of a third embodiment of a hand-powered speargun.

Two band conduits 14 may extend entirely within the barrel 12 from a first end 28 of the barrel 12 to a second end 30 of the barrel 12, with one band conduit 14 on either side of and at equal distances from the spear conduit 16 (as shown in FIGS. 4 and 5). In other words, the each band conduit 14 may be disposed between the spear conduit 16 and the first 24 and second 26 rounded surfaces. The band conduits 14 may be sized and configured to accommodate a portion of rubber tubing 40 having a lumen 42 therein (herein referred to as a "band"). The inner diameter $D_{IBC}$ of each band conduit 14 may be larger than the outer diameter $D_{OB}$ of the band 40 when the band is in a neutral position (that is, a pull force is not being exerted on the band). Rubber tubing is available in a variety of dimensions. The band attachment means shown and described in more detail in FIGS. 9A-9E may allow for interchanging bands 40 having various wall thicknesses, outer diameters, and inner diameters, according to the user's preference. For example, the user may select between bands 40 having an outer diameter $D_{OB}$ of between approximately 3 mm and approximately 14 mm, and the inner diameter $D_{IBC}$ of each band conduit 14 may be sized to accommodate a number of these bands 40 individually. Further, the inner diameter $D_{IBC}$ of the band conduits 14 may be the same as, approximately the same as, or different than the inner diameter $D_{ISC}$ of the spear conduit 16. As a non-limiting example, the inner diameter $D_{IBC}$ of each band conduit 14 may be between approximately 9 mm and approximately 18 mm. The band attachment means may provide the distal points of band attachment to the barrel 12, and the band conduit openings 38A at the first end 28 of the barrel 12 may provide the proximal points of band attachment, even though the bands are not physically coupled or affixed to the barrel at this location. Anchoring a length of band 40 between the attachment means (distal points of attachment) and the band conduit openings 38A (proximal points of attachment) may allow the user to exert a greater pull force on the band and therefore create more power for expelling the spear and may prevent undesired movement in the barrel 12 as the tensioned band 40 is released. For example, the band 40 may be anchored between the distal and proximal points of attachment by the band conduits 14 (as shown in FIGS. 1-5) or by other means (for example, as shown in FIGS. 10 and 11).

The barrel 12 may be composed of any suitable material, such as metal, plastic, wood, or combination thereof. For example, the barrel 12 may be composed of a light-weight, corrosion-resistant metal such as aluminum. Further, the barrel 12 may be manufactured from a single piece of material, which may reduce cost and complexity and may make the speargun 10 more robust than known designs. As non-limiting examples, a plastic or metal barrel may be injection molded, a metal barrel may be extruded, and a wooden barrel may be created using a router or lathe to create two halves, which can then be coupled to each other to form a barrel having circular conduits. Additionally, the band 40 may be composed of any material that is resiliently deformable and that has a lumen 42 that is distendable. That is, the band 40 may be stretchable in order to allow the user to exert a pull force on the band 40 that creates sufficient power to expel a spear 32 from the speargun 10. For example, the band 40 may be composed of latex rubber.

As shown in FIG. 1, the speargun 10 may further include a means for engaging the band 40 with the proximal or butt end 44 of the spear 32. For example, the band 40 may be threaded through a hole in a spear retainer 46 so that the spear retainer 46 lies at the bend 48 in the band 40. The spear retainer 46 may include a recess 50 within which the butt end 44 of the spear 32 may be matably engageable. The spear 32 may not be permanently affixed to the spear retainer 46, but may instead be secured within the spear retainer 46 by the pressure exerted from the spear 32 on the spear retainer 46 when the user retracts the spear 32 and creates a pull force on the band 40. Alternatively, the speargun 10 may not include a spear retainer 46, and instead the butt end 44 of the spear 32 may include a notch or recess sized and configured to accommodate the band 40 (not shown).

The track 18 on one or more surfaces 20, 22, 24, 26 of the barrel 12 may be recessed within the barrel 12 and releasably engageable with one or more accessories. Alternatively, the track 18 may protrude from a surface of the barrel 12 (not shown). The track 18 may extend from the first end 28 to the second end 30 of the barrel 12, or along a portion of a surface. In any configuration, however, the track 18 may include at least one open end that is coextensive with the first end 28 or second end 30 of the barrel 12. For example, the barrel 12 may include a track 18 extending the length of the first flattened surface 20 and the second flattened surface 22 (as shown in FIGS. 4 and 5). Further, each track 18 may be a T-shaped groove within the barrel in cross section, such that the cross section of the track 18 includes an inner portion 52 having a diameter $D_{TI}$ and an outer portion 54 having a diameter $D_{TO}$, wherein $D_{TI}$ may be greater than $D_{TO}$. An accessory may include a mounting bracket 56 that is engageable with the track 18, such that a portion of the bracket 56 is disposed within the bottom portion 52 and prevented from disengaging with the track 18 by the narrowed diameter of the upper portion 54. In the non-limiting embodiment shown in FIGS. 1-3, the accessories may include a handle 58 and a cord reel 60. The handle 58 may have any of a variety of shapes and configurations, such as a fin shape (as shown and described in FIGS. 1, 7, and 8) or a spool shape (as shown in FIGS. 2 and 3). Further, as shown in the figures, the handle 58 may be engaged with the recessed track on the first surface 20 of the barrel 12 (which may be referred to as the top surface of the barrel 12 when viewed in relation to a user when the speargun 10 is in use). Although the placement and configuration of these handles may provide certain advantages, it will be understood that a handle having any size or shape may be used.

Figure 7:
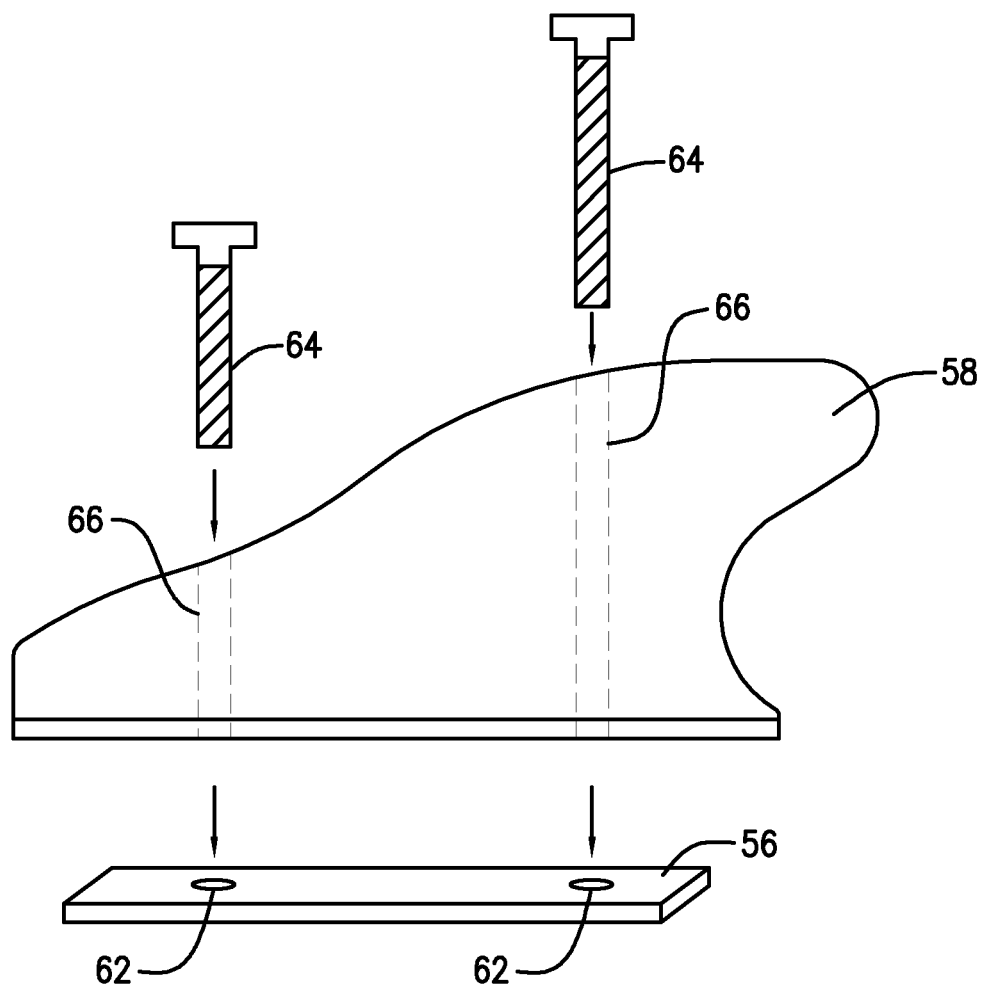
FIG. 7 shows an exploded view of an exemplary hand-powered speargun handle.
Figure 8:
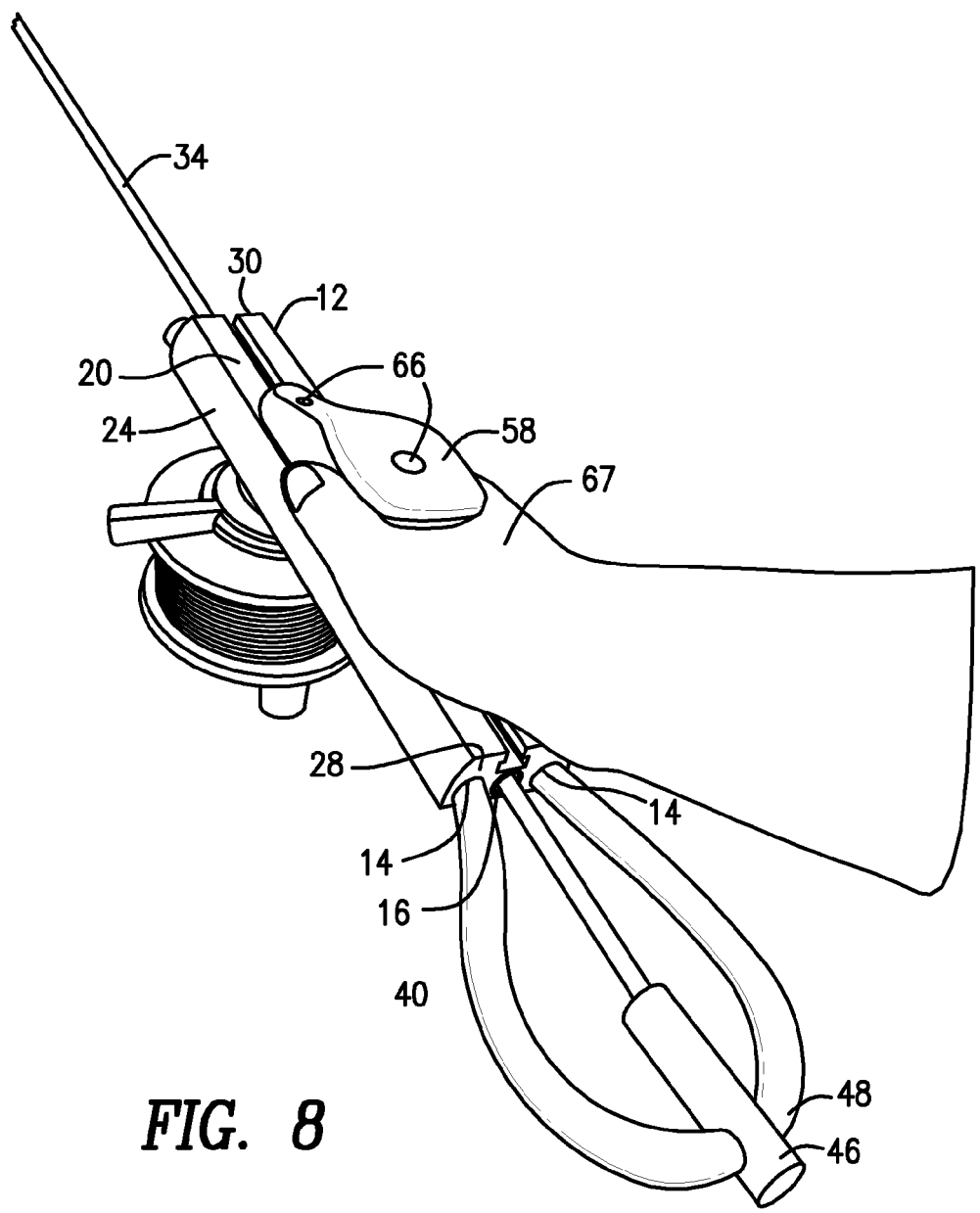
FIG. 8 shows the exemplary hand-powered speargun handle in use.

Referring now to FIGS. 7 and 8, an exemplary handle is shown in greater detail. The handle 58 may include a mounting bracket 56 that is engageable with the track 18 at one or more locations. The mounting bracket 56 may be sized and configured to be slidably insertable into the bottom portion 52 of the track 18 from an open end of the track 18. For example, the bracket may be flattened, as shown in FIGS. 6A-7. The bracket 56 may include one or more openings 62 into which a screw or threaded post 64 may be rotatably engaged. For example, the fin-shaped handle 58 may include a plurality of conduits 66 through which a screw or threaded post 64 may be inserted, and the screw or threaded posts 64 may extend from the handle 58 into the track 18 and into the one or more openings 62 of the bracket 56. Advancing the screws or threaded posts 64 into the bracket openings 62 may tighten the handle 58 against the barrel 12, and reversing the screws or threaded posts 64 within the bracket openings 62 may loosen the handle 58 against the barrel 12, allowing the user to slide the handle 58 along the track 18 to a desired position. Also, the screws or threaded posts 64 may be complete removed from the bracket holes 62 for removal of the handle 58 from the barrel 12. A spool-shaped handle 58 (as shown in FIGS. 2 and 3) may be similarly engageable with the track 18, but may instead include only a single threaded post 64. Further, a threaded post 64 may be integrated with the spool-shaped handle 58 such that the entire handle 58 may be rotated to engage the threaded post 64 with the mounting bracket 56 within the track 18. Additionally, as shown and described in greater detail in FIGS. 9A-9E, the threaded post 64 of the spool-shaped handle may be used to remove the band 40 from the speargun 10.

As shown in FIG. 8, the inner curve of the fin-shaped handle 58 (or the concave portion of the spool-shaped handle) may generally conform to the user's hand 67, particularly to the area of the hand between the thumb and forefinger. This configuration may allow the user to hold the speargun 10 without grasping the barrel 12 or handle 58 with the fingers, which may reduce tension in the user's hand and/or arm and improve spear shot accuracy. Additionally, this handle configuration may make it easier to hold the speargun 10 even if the user is wearing bulky gloves. Still further, this handle configuration may reduce torque when compared to a pistol-type handle because the pivot point of the barrel 12, which may be the location at which the user grasps the handle, is closer to the longitudinal axis of the band 40. In general, the design of a pistol-type handle may naturally cause the user to grasp the handle at a location that is farther away from the band 40 and the barrel 12 than a fin-shaped or spool-shaped handle 58.

Referring now to FIGS. 9A-9E, a method for coupling and removing a band from a hand-powered speargun is shown. The speargun 10 may include a band attachment means, referred to as a "plug" 68. The plug 68 may be used to quickly and easily affix a band 40 to the speargun 10, and yet is equally easily removable, which allows the user to replace aging or damaged bands and interchange bands with different characteristics (for example, length, wall thickness, flexibility, stretchability, outer diameter, inner diameter, and the like).

The plug 68 may be composed of any suitable material, such as wood, plastic, or metal, and may include a body portion 70 and a head portion 72. The body portion 70 may be cone shaped, having a wedge shape in cross section that comes to a rounded point at the tip 74. Further, the body portion 70 may include a texturizing finish on its outer surface. For example, the body portion 70 may include a coating of a material having a high coefficient of friction, such as polyurethane. Alternatively, the outer surface of the body portion 70 may be sanded, etched, striated, ridged, threaded, or may have another finish that increases friction between the plug 68 and the surfaces of the band lumen 42. Further, the body portion 70 may include a range of increasing diameters from the tip 74 to the head portion 72, at least one of which being greater than the inner diameter $D_{IBC}$ of the band conduit 14 and at least one of which being greater than the inner diameter $D_{IBL}$ of the band lumen 42. The head portion 72 may be coextensive with the largest diameter of the body portion or it may include a diameter that is larger than the largest diameter of the body portion 70, creating a ledge 76 between the body portion 70 and the head portion 72 (as shown in FIGS. 9A-9E). The plug 68 may further include a face 78 in the head portion 72 and a threaded conduit that extends from the face 78 to a point that is at least partially within the body portion 70. The threaded conduit 80 may be coaxial or substantially coaxial with the longitudinal axis 82 of the plug 68, whereas the face 78 may be orthogonal or substantially orthogonal to the longitudinal axis 82. The face 78 may be, for example, flattened (as shown in FIGS. 9A-9E) or domed (as shown in FIG. 1) and the outer edge 84 may be rounded. However, it will be understood that the face 78 and outer edge 84 may have any other suitable configuration (for example, stepped, concave, textured, polyhedral, square, rectangular, or the like). The diameter $D_{PF}$ of the face 78 may be greater than the inner diameter $D_{IBL}$ of the band lumen 42 and the inner diameter $D_{IBC}$ of the band conduit 14.

Figure 9A:
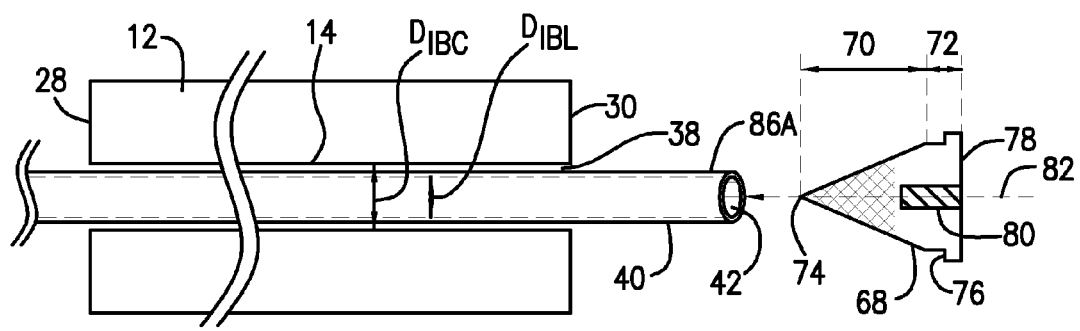
Figure 9B:
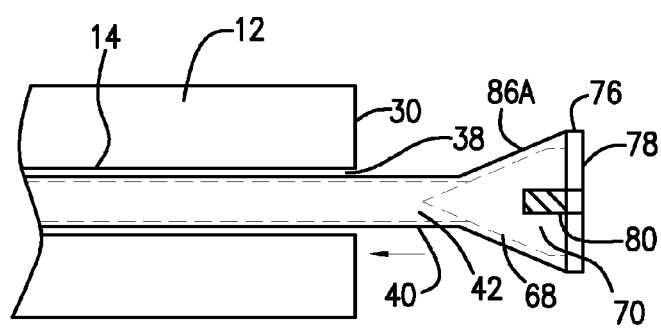
Figure 9C:
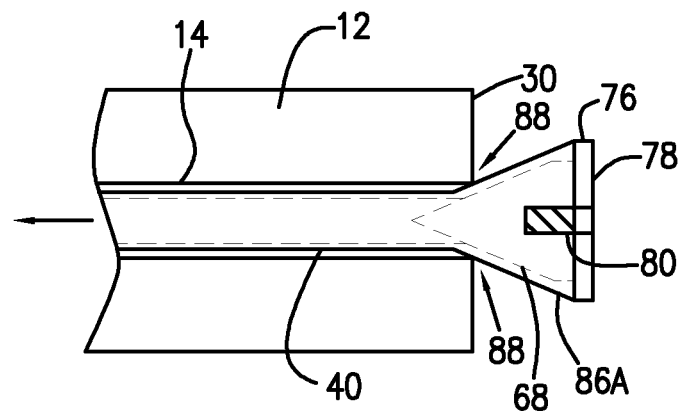
Figure 9D:
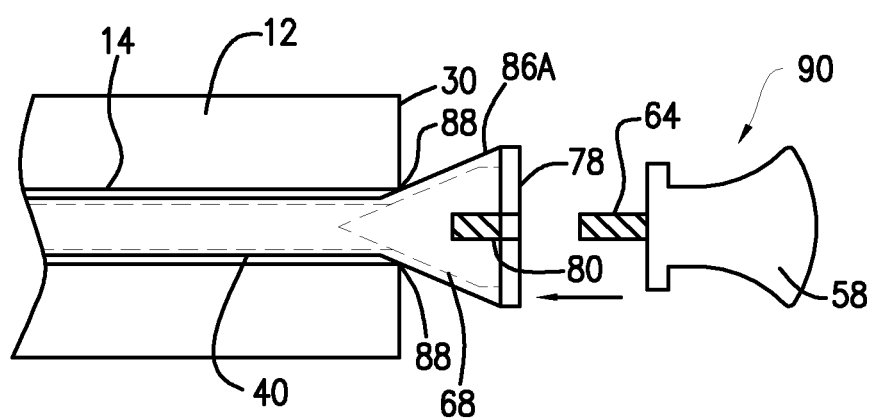

FIGS. 9A-9C show a method of affixing a band 40 to a speargun 10, whereas FIGS. 9D and 9E show a method of removing the band 40 from the speargun 10. As shown in FIG. 9A, a first end 86A of the band 40 may be inserted through a first band conduit opening 38A at the first end 28 of the barrel 12, then passed out the band conduit opening 38 at the second end 30 of the barrel 12. In this first step, a portion of the band 40 may extend a distance from the second end 30. The body portion 70 of the plug 68 may then be inserted into the band lumen 42 (as shown in FIG. 9B) until the edge of the band 40 abuts the ledge 76 or until the cone shape of the body portion 70 of the plug 68 stretches the band 40 to its elastic limit. The plug 68 may be secured within the lumen 42 by contact between the texture and/or coating on the outer surface of the plug body portion 70 and the band material within the lumen 42 (for example, latex rubber, natural rubber, polyurethane rubber, elastomeric rubber, thermoplastic polymer, and the like). As shown in FIG. 9C, the band 40 may then be retracted through the band conduit 14 toward the first end 28 of the barrel 12 until the plug 68 is stopped by the opening 38 of the band conduit 14. For example, the band 40 disposed about a the body portion 70 at a diameter that is greater than the inner diameter $D_{IBC}$ of the band conduit 14 may be pinched at one or more compression points 86 against the plug 68, thereby locking the band 40 and the plug 68 in place within the band conduit 14. The second end 86B of the band 40 may be likewise affixed to the speargun 10 according to the method described above. It will be understood that the plug 68 may be of any size, as long as at least a portion of the body portion 70 is insertable into the band conduit 14 and the band lumen 48. Further, the plug 68 may be smaller than that shown in FIGS. 9A-9E, such that a larger portion of the body portion 70 is insertable into the band conduit 14 and the face 78 of the plug 68 is closer to the second end 30 of the barrel 12 when the band 40 is affixed to the speargun 10.

As shown in FIG. 9D, a tool 90 may be used to disengage the plug 68 from the band conduit 14, which releases the band 40 for removal. The tool 90 may include a threaded post 64 that is rotatably engageable with the threaded conduit 80 within the plug 68. As a non-limiting example, a handle 58 having one or more threaded posts 64 (such as the handle 58 shown and described in FIGS. 2, 3, and 7) may also be used as a plug removal tool 90. Once the threaded post 64 of the tool 90 is engaged with the threaded conduit 80 of the plug 68, the plug 68 may be pulled out from within the first end 86A band lumen 42 and, therefore, the band conduit 14 (as shown in FIG. 9E). Removal of the plug 68 may disengage the band 40, and the band 40 may be easily removed from the band conduit 14. The plug 68 may be likewise removed from the second end 86B of the band 40 according to the method described above.

Figure 12:
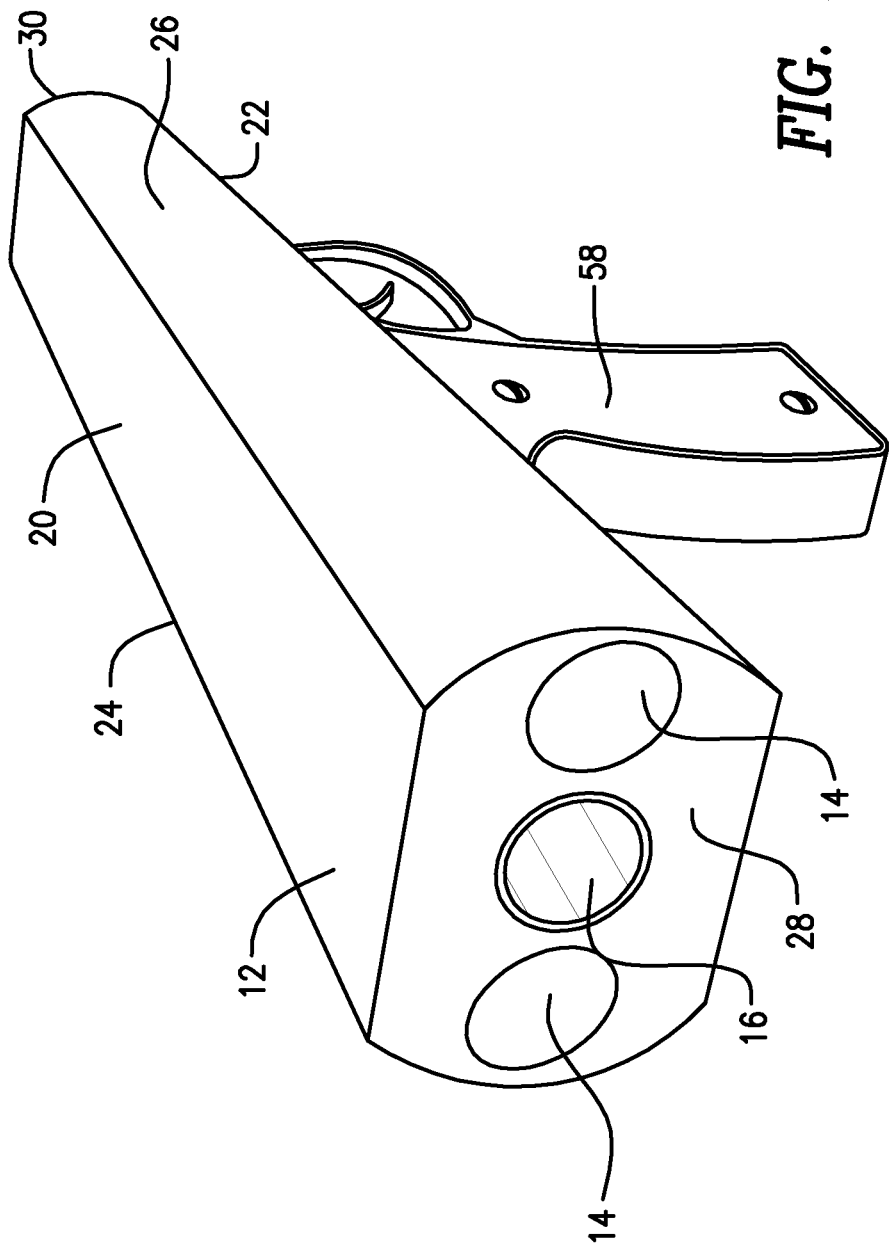
FIG. 12 shows a perspective view of a fourth embodiment of a hand-powered speargun.

Referring now to FIGS. 10-13, additional embodiments of a hand-powered speargun are shown. The embodiments shown in FIGS. 10-13 offer some of the same advantages as the embodiment shown in FIGS. 1-6B. Specifically, the additional embodiments each include distal points of band attachment and proximal points of band attachment. Additionally, the embodiments of FIGS. 11 and 13 may include a fin-shaped handle 58, which may provide less torque than a pistol-style handle when a pull force is exerted on the band 40 (that is, when the band is tensioned). However, some users may prefer the feel of a standard pistol-style handle (as shown in FIGS. 10 and 12), and the speargun 10 described herein may be adapted for use with this type of handle as well.

Referring now to FIG. 10, a second embodiment of a hand-powered speargun is shown. Rather than a barrel 12 with an internal spear conduit 16 and band conduits 14 (as shown in FIGS. 1-6B), the embodiment of FIG. 10 may include an exposed spear conduit 16A that is connected to a proximal end plate 92 at a first end and a distal end plate 94 at a second end. The spear conduit 16A may be a tubular conduit with a circular cross section, although other cross-sectional shapes may be used. As with the barrel 12 of FIGS. 1-6B, the exposed spear conduit may have a length of between approximately six inches (about 152.4 mm) and approximately 14 inches (about 355.6 mm). The inner diameter $D_{ISC}$ of the spear conduit 16A may be the same or similar to the dimensions described in the first embodiment of the hand-powered speargun. Additionally, one or more bushings 36 may be used within the spear conduit 16A.

The spear conduit 16A may include an opening at each end. A first of these openings may be coextensive with and in communication with a first spear conduit opening 100A in the proximal end plate 92 and a second of these openings may be coextensive with and in communication with a second spear conduit opening 100B in the distal end plate 94. Each end plate may lie in a plane that is substantially orthogonal to the longitudinal axis of the spear conduit 16A (as shown in FIGS. 10 and 11). Further, the end plates 92, 94 may be discrete components that are coupled or affixed to the spear conduit 16A or they may be integrated with the spear conduit 16A (for example, if the end plates 92, 94 and the spear conduit 16A are manufactured as a single piece). Additionally or alternatively, the end plates 92, 94 may be coupled or affixed to the base 96 or may be integrated with the base 96. In a non-limiting example, the exposed spear conduit 16A is coupled to the end plates 92, 94 and the base 96 (for example, using adhesives, bonding agents, or mounting hardware such as screws, nails, brackets, snaps, clasps, or the like), and the end plates 92, 94 may also be coupled to or integrated with the base 96. Further, the end plates 92, 94 may be removably attachable to the spear conduit 16A and/or the base 96, giving the user the option to use any of a variety of plates that include openings to accommodate more than two bands and/or more than one spear and/or spears and bands of different diameters.

Each end plate 92, 94 may also include one or more band openings 98A, 98B. Although these openings may not be in communication with exposed band conduits similar to the exposed spear conduit 16A, the openings 98A, 98B may nonetheless provide pathways for the band 40 that are parallel or substantially parallel to the spear conduit 16A. Further, the openings 98B on the distal face place 94 may provide a distal point of attachment when a band attachment means is used, such as the plugs 68 shown and described in FIGS. 9A-9E, and the openings 98A on the proximal face plate 92 may provide a proximal point of attachment (even though the band 40 is not affixed to the openings 98A on the proximal face plate 92).

The base 96 may have any configuration that allows for the attachment of or integration with a handle 58 and end plates 92, 94. For example, the base 96 may be a plate (as shown in FIG. 10). The handle 58 may be integrated with the base 96, or it may be removable attached to the base 96, such as by using mounting hardware such as screws, nails, brackets, clasps, or the like. The handle may be shaped like a standard pistol grip and may be located on the bottom of the base 96 when in use. The exposed spear conduit 16A, the base 96, the end plates 92, 94, and the handle 58 may be composed of the same or different materials, such as wood, metal, plastic, or combinations thereof.

Referring now to FIG. 11, a third embodiment of a hand-powered speargun is shown. Like the embodiment sown in FIG. 10, the embodiment shown in FIG. 10 may include an exposed spear conduit 16A, a proximal end plate 92 having band openings 98A and a spear conduit opening 100A, and a distal end plate 94 having band openings 98B and a spear conduit opening 100B. For example, each end plate 92, 94 may include two band openings 98A, 98B and one spear conduit opening 100A, 100B. The distal end plate 94 may provide a distal point of band attachment when used with a band attachment means such as plugs 68, as shown and described in FIGS. 9A-9E. Also, the proximal end plate 92 may provide a proximal point of band attachment, even though the band 40 may not be affixed to the openings 98A of the proximal end plate 92.

Unlike the embodiment shown in FIG. 10, however, the embodiment shown in FIG. 11 may not include a base 96 and a pistol-style handle 58. Instead, the exposed spear conduit 16A may include an integrated handle at the top of the spear conduit 16 (as shown in FIG. 11) or the bottom of the spear conduit 16A when in use. Alternatively, the exposed spear conduit 16A may include a recessed track, such as that shown and described in FIGS. 1-6B, on one or more surfaces of the spear conduit 16A to which a handle 58 may be removably attached.

Referring now to FIG. 12, a fourth embodiment of a hand-powered speargun is shown. The speargun of FIG. 12 may include a barrel 12 that is generally like the barrel 12 shown and described in FIGS. 1-6B, and which has internal band conduits 14 and an internal spear conduit 16. The barrel 12 shown in FIG. 12 may include a pistol-style handle 58 that is integrated with, permanently affixed to, or removably attached to the second flattened surface 22 of the barrel 12. For example, the handle 58 may be affixed to the barrel 12 using adhesive, bonding agent, or mounting hardware, such as screws, nails, brackets, clasps, or the like. Alternatively, the barrel 12 may include a track 18 on the second flattened surface 22, or other surfaces 20, 24, 26, of the barrel 12 to which the handle 58 may be removably attached (for example, as shown and described in FIGS. 1-7).

Figure 13:
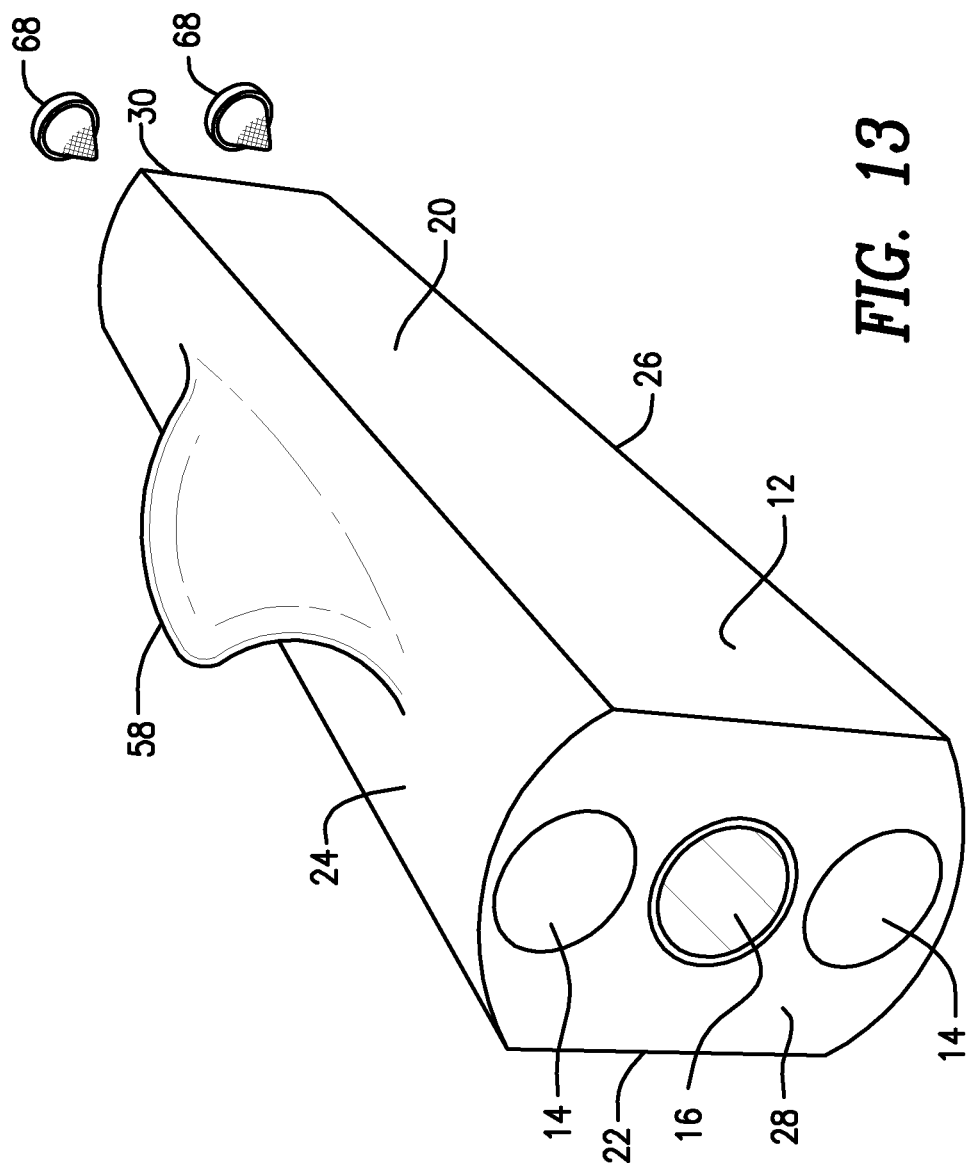
FIG. 13 shows a perspective view of a fifth embodiment of a hand-powered speargun.

Referring now to FIG. 13, a fifth embodiment of a hand-powered speargun is shown. The speargun of FIG. 13 may include a barrel 12 that is generally like the barrel shown and described in FIGS. 1-6B, and which has internal band conduits 14 and an internal spear conduit 16. However, the embodiment of FIG. 13 may include a handle that is integrated with, permanently affixed to, or removably attached to the first rounded surface 24 or the second rounded surface 26 of the barrel 12. Alternatively, the barrel 12 may include a track 18 on the first rounded surface 24, or other surfaces 20, 22, 26, of the barrel 12 to which the handle 58 may be removably attached (for example, as shown and described in FIGS. 1-7). This may give the speargun a configuration in which the band conduits are stacked ("over/under") when the speargun is in use, and the band 40 may be usable in a manner that is similar to an archery bow.

It will be understood that any dimensions may be used for the spear conduit 16, band conduits 14, bushings 36, track 18, plugs 68, and/or other components of the barrel 12, band 40, and/or handle 58 that are suitable to accommodate the spear 32, are comfortable to the user, and can generate the power required to expel the spear from the speargun 10. Further, it will be understood that even thought the barrel surfaces 20, 22, 24, 26 are described as "flattened" or "rounded," these surfaces may have any configuration that accommodates the internal band conduits 14 and spear conduit 16 and that allow for the attachment of accessories thereto.

Referring now to FIG. 14, a hand-powered speargun in use is shown. As a non-limiting example, the speargun 10 may be used underwater to spear fish. To fire the spear 32 at a target, the user may engage the butt end 44 of the spear 32 and the band 40 (for example, using a spear retainer 46). The user's one hand may be engaged with the handle 58 and the other hand may grasp the spear shaft 34 or both the spear shaft 34 and the band 40. Then, the user may retract the band 40 away from the barrel 12, thereby exerting a pull force on the band. When the user releases the band 40, the force with which the stretched band 40 returns to its neutral state may provide sufficient power to expel the spear 32 from the first end 28 of the barrel 12 and toward the target.

It will be appreciated by persons skilled in the art that the present invention is not limited to what has been particularly shown and described herein above. In addition, unless mention was made above to the contrary, it should be noted that all of the accompanying drawings are not to scale. The various embodiments shown and described herein are not mutually exclusive, and a variety of modifications and variations are possible in light of the above teachings without departing from the scope and spirit of the invention, which is limited only by the following claims.

What is claimed is:

1. A spearfishing device, the device comprising:
an elongate barrel including a first planar end, a second planar end, a first surface, a second surface, a third surface, and a fourth surface, the barrel including a length along a shooting axis and a width across the shooting axis with the length being greater than the width, the barrel defining a spear conduit along the shooting axis and two band conduits that are parallel to the spear conduit, each of the spear conduit and the two band conduits extending entirely within the barrel from the first planar end to the second planar end, and each of the first, second, third, and fourth surfaces extending from the first planar end to the second planar end.

2. The device of claim 1, wherein the spear conduit is coaxial with the shooting axis.

3. The device of claim 2, wherein the spear conduit is located between the two band conduits.

4. The device of claim 1, wherein the first and second surfaces are flattened.

5. The device of claim 4, wherein at least one of the first and second surfaces defines a recessed groove.

6. The device of claim 5, wherein the recessed groove extends from the first planar end of the barrel to the second planar end of the barrel.

7. The device of claim 5, wherein the recessed groove has a T-shaped cross section.

8. The device of claim 5, further comprising a handle that is releasably engaged with the recessed groove, the handle having a shape selected from the group consisting of a spool-shaped handle, a fin-shaped handle, and a pistol-style handle.

9. The device of claim 1, wherein the third and fourth surfaces are rounded.

10. A spearfishing device, the device comprising:
a barrel including:
a spear conduit being located entirely within the barrel and defining a longitudinal shooting axis, a length along the longitudinal shooting axis, and a width across the longitudinal shooting axis, the length being greater than the width;
a first band conduit and a second band conduit, each of the first and the second band conduits being located entirely within the barrel and defining a longitudinal axis that is substantially parallel to the longitudinal shooting axis of the spear conduit, each of the first and the second band conduits defining a length along the longitudinal axis, and a width across the longitudinal axis, the length being greater than the width, the length of the spear conduit, the length of the first band conduit, and the length of the second band conduit being the same; and
a first planar surface and a second planar surface, each planar surface defining a first opening, a second opening, and a third opening, the spear conduit extending between the second opening of the first planar surface and the second opening of the second planar surface, each planar surface being substantially orthogonal to the longitudinal shooting axis of the spear conduit.

11. The device of claim 10, further including a band having a first end and a second end, the first end being attached to the third opening of the second planar surface and the second end being attached to the first opening of the second planar surface, a first portion of the band passing through the third opening of the first planar surface and a second portion of the band passing through the first opening of the first planar surface.

12. The device of claim 11, further including a handle integrated with the spear conduit.

13. The device of claim 11, further including a base coupled to the first planar surface and the second planar surface and a pistol-style handle that is coupled to the base.

14. A spearfishing device, the device comprising:
a barrel including a first flattened surface, a second flattened surface, a first rounded surface, a second rounded surface, a shooting axis, a first end having a first planar surface, a second end having a second planar surface, a length along the shooting axis, and a width across the shooting axis, the length being greater than the width and extending from the first planar surface to the second planar surface;
a spear conduit defined within the barrel along the shooting axis and extending from the first end planar surface to the second end planar surface;
a first band conduit and a second band conduit, each band conduit being defined within the barrel and extending from the first end planar surface to the second end planar surface, the spear conduit being located between and parallel to the first and second band conduits;
a band having a first end and a second end, a first portion of the band being disposed within the first band conduit and a second portion of the band being disposed within the second band conduit;
a first band attachment means coupling the first end of the band to the barrel at the second end planar surface of the barrel and a second band attachment means coupling the second end of the band to the barrel at the second end planar surface of the barrel, such that the band passes within the first band conduit from the first band attachment means to the first end of the barrel, out of the first band conduit at the first end of the barrel, into the second band conduit at the first end of the barrel, and within the second band conduit from the first end of the barrel to the second band attachment means; and
at least one recessed groove defined in at least one of the first flattened surface and the second flattened surface of the barrel.

15. The device of claim 14, wherein each of the first and second band attachment means is a plug including a longitudinal axis, a body portion, and a head portion.

16. The device of claim 15, wherein the plug body portion is cone shaped.

17. The device of claim 16, wherein the head portion defines a face that is substantially orthogonal to the longitudinal axis of the body portion.

18. The device of claim 17, wherein the plug further includes a linear threaded conduit that extends within the plug from the face to a location within the body portion.

* * * * *